(12) United States Patent
Kramer-Massow

(10) Patent No.: US 6,244,610 B1
(45) Date of Patent: Jun. 12, 2001

(54) TWO WHEELED VEHICLE, ESPECIALLY A BICYCLE

(76) Inventor: Klaus Kramer-Massow, Pochgasse 4, D-79104 Freiburg (DE)

( * ) Notice: Subject to any disclaimer, the term of this patent is extended or adjusted under 35 U.S.C. 154(b) by 0 days.

(21) Appl. No.: 09/297,428

(22) PCT Filed: Oct. 28, 1997

(86) PCT No.: PCT/DE97/02498

§ 371 Date: Apr. 28, 1999

§ 102(e) Date: Apr. 28, 1999

(87) PCT Pub. No.: WO98/18671

PCT Pub. Date: May 7, 1998

(30) Foreign Application Priority Data

Oct. 28, 1996 (DE) .............................................. 296 18 383

(51) Int. Cl.[7] .................................................. B62K 25/28
(52) U.S. Cl. ........................................ 280/283; 280/284
(58) Field of Search ................................. 280/283, 284, 280/285, 286

(56) References Cited

U.S. PATENT DOCUMENTS

| | | | |
|---|---|---|---|
| 1,283,030 | * 10/1918 | Ashton | 280/284 |
| 5,335,929 | 8/1994 | Takagaki et al. | |
| 5,409,249 | 4/1995 | Busby. | |
| 5,452,910 | 9/1995 | Harris. | |
| 5,628,524 | * 5/1997 | Klassen et al. | 280/284 |
| 5,860,665 | * 1/1999 | Giles | 280/284 |
| 6,036,213 | * 3/2000 | Busby | 280/284 |
| 6,076,845 | * 6/2000 | Lawwill et al. | 280/284 |
| 6,131,934 | * 10/2000 | Sinclair | 280/284 |
| 6,161,858 | * 12/2000 | Tseng | 280/283 |

FOREIGN PATENT DOCUMENTS

| | | | |
|---|---|---|---|
| 4041375 | * 6/1992 | (DE) | 280/284 |
| 44 35 482 | 4/1996 | (DE). | |

* cited by examiner

*Primary Examiner*—Lanna Mai
*Assistant Examiner*—Ruth Ilam
(74) *Attorney, Agent, or Firm*—Gudrun E. Huckett

(57) ABSTRACT

A two-wheeled vehicle has a frame having a wheel support member at the rear of the frame. A rear wheel is spring-supported at the wheel support member. A first lever is rotatably mounted by a first rotary bearing at the frame and by a second rotary bearing at the wheel support member. A second lever is rotatably mounted at an upper end portion of the wheel support member and the frame, respectively. A spring element is rotatably mounted at the frame and/or the wheel support member and/or the first lever and/or the second lever, respectively. The second rotary bearing is positioned above the axle of the rear wheel and is positioned at the wheel support member, when viewed from the axle of the rear wheel toward a front end of the vehicle, at a distance of between 0.045 to 0.8 times the length of the wheel support member from the axis of the rear wheel.

7 Claims, 3 Drawing Sheets

TWO WHEELED VEHICLE, ESPECIALLY A BICYCLE

BACKGROUND OF THE INVENTION

The invention relates to a two-wheeled vehicle, especially a bicycle, having a frame, a drive chain wheel arranged at a lower end of the frame, as well as a rear wheel which is spring-supported at a wheel support member at the rear end of the frame.

The special field of application of the inventive rear wheel spring arrangement with a corresponding wheel suspension are bicycles. -Basically, however, the general inventive principle is also suitable for and applicable to motor-driven, two-wheeled vehicles.

In conventional spring systems for two-wheeled vehicles, the bearing of the chain strut is usually positioned directly in the area of the tread bearing axle in order to achieve a largely drive-free and brake-effect-free spring kinematic action without a pedal back kick. Due to space problems, however, a large-dimensioned, stabile and long-lived bearing is often problematic in this area.

Based on the aforementioned, it is an object of the invention to create an improved spring system for two-wheeled vehicles, particularly, bicycles.

SUMMARY OF THE INVENTION

As a technical solution, it is suggested by the invention that a first lever is rotatably arranged between the frame and the wheel support member, that a second lever is rotatably arranged respectively between the upper end portion of the wheel support member and the frame, and that a spring and/or damping element is rotatably arranged respectively between the first lever and/or the second lever and/or the wheel support member and the frame.

Thereby, a four-bar system of a two-wheeled rear spring arrangement is realized with a stable, large-dimensioned bearing of the rear structure swing at the frame and, at the same time, a drive-free and brake-impact-free spring kinematic action without a significant pedal back kick. The basic idea of the rear wheel spring arrangement is that the rear wheel support member for the rear wheel is rotatably arranged at the frame by two levers and, therefore, that this bar system defines a rear structure swing arranged at the frame. The two levers are respectively attached with their two end portions by rotary bearings to the frame and to the wheel support member. This is also true for the spring and/or damping element whose two end portions, respectively, are mounted by a rotary bearing to the frame or to the rear structure swing. The spring and/or damping element is preferably a compression spring, namely, a spiral coiled spring or a pneumatic spring.

An advantageous embodiment of the inventive two-wheeled vehicle suggests that the rotary bearing of the first lever is positioned at the frame above the bearing of the drive chain wheel. Advantageously, the rotary bearing is positioned above the drive chain wheel. "Above the drive chain wheel" is to be understood such that the rotary bearing is positioned outside of the circular area of the drive chain wheel, i.e., above the travel area of the drive chain. This has the advantage that the first lever does not interfere space-wise in the area of the drive chain wheel. In the event that several drive chain wheels are present, the rotary bearing can be positioned above the largest of the drive chain wheels. However, it is also conceivable that the rotary bearing is positioned only above the intermediate drive chain wheel, but within the circular area of the largest drive chain wheel. In a further alternative it is conceivable that the rotary bearing is positioned above the smallest drive chain wheel, but within the circular area of the intermediate drive chain wheel. Finally, it is also conceivable that the rotary bearing is positioned in the transition area of one of chain wheels to another chain wheel.

A further embodiment of the inventive two-wheeled vehicle suggests that the rotary bearing of the first lever is positioned at the wheel support member above the axis of the rear wheel. This is to be understood such that the rotary bearing is not positioned within the area of the rear wheel and, therefore, so that the first lever does not interfere with regard to space considerations. In combination with the aforementioned arrangement of the rotary bearing of the first lever above the drive chain wheel, the first lever is therefore positioned above the drive chain and, therefore, does not interfere. The particular advantage of this embodiment lies in the specific kinematic properties of the lever arrangement as a whole. This will be explained in detail later on.

Advantageously, the rotary bearing of the first lever is positioned at the wheel support member, as viewed from the axis of the rear wheel, at a DISTANCE of between 0.045 to 0.8 times, especially 0.25 to 0.4 times, the length of the wheel support member from the axis of the rear wheel. Translated into the relationship of the distance b of the axis of the rear wheel to the rotary bearing of the first lever at the wheel support member to the distance a of the rotary bearing of the second lever at the wheel support member, this means approximately: $1/20 < b/a < 4/1$. Thus, an optimum area is created for the arrangement of the rotary bearing at the wheel support member, with the length of the wheel support member normally amounting to 25 to 44 cm. The optimum position of the rotary bearing lies approximately—again as viewed from the axis of the rear wheel—at about $1/3$ of the entire length of the wheel support member.

A further embodiment suggests that the rotary bearing of the first lever at the wheel support member is positioned, as viewed from the ground vertical direction, at least 20 mm above the axis of the rear wheel. Due to this feature, an optimum position for the rotary bearing of the first lever at the wheel support member is also created without resulting in spacial problems for the first lever. In co-operation with the arrangement of the lever system as a whole, optimum kinematic relationships result therefrom.

A further embodiment of the inventive two-wheeled vehicle suggests that the wheel support member is tilted. Advantageously, the wheel support member is tilted such that it defines a kind of a roof, i.e., the wheel support member is tilted upwardly, as viewed in the travel direction. The tilted area advantageously is positioned where the first lever is connected to the wheel support member.

A corresponding embodiment for the first lever suggests that it is also tilted, namely, upwardly, as viewed in the travel direction. The tilted area is advantageously positioned in the area of the attachment of the first lever to the frame.

A further embodiment of the inventive vehicle suggests that the second lever is tilted upwardly or downwardly, relative to the wheel support member.

An embodiment thereof suggests that, in the rest position of the spring, the angle between the connecting line between the rotary bearing of the first lever at the wheel support member and the rotary bearing of the wheel support member at the second lever, on the one hand, and the connecting line between the rotary bearing of the wheel support member at the second lever and the rotary bearing of the second lever at the frame, on the other hand, lies between 90° and 180° or between 270° and 360°. Thereby, an optimum lever kinematic action is created during the spring-compression movement. Upon this spring compression movement and an upward tilt of the lever, the angle between the wheel support member and the lever will decrease, e.g., to approximately 45° at maximum spring compression, while the second lever moves backwardly relative to the wheel support member. If the second lever is tilted upwardly, the angular range lies between 90° and 180°, while the angular range lies between 270° and 360° for a downward tilt. The 0°-line is defined by the connecting line of the rotary bearings of the two levers at the wheel support member.

Furthermore, it is suggested in an embodiment of the inventive two-wheeled vehicle that, in the rest position of the spring arrangement, the wheel support member and the spring and/or damping element lie approximately aligned with one another. Thereby, an optimum co-operation is achieved with respect to the kinematic behavior of the rear structure swing and the spring action.

Finally, it is suggested in an embodiment thereof that the distance between the rotary bearing of the wheel support member at the second lever and the rotary bearing of the second lever at the frame corresponds approximately to the distance between the rotary bearing of the spring and/or damping element at the second lever and the rotary bearing of the second lever at the frame. The advantage of this is that no lever forces act on the second lever during the spring-compression movement.

BRIEF DESCRIPTION OF THE DRAWINGS

Two embodiments of an inventive two-wheeled vehicle in the form of a bicycle will be described with the aid of the drawings in the following. It is shown in.

DESCRIPTION OF PREFERRED EMBODIMENTS

Figure 1A:
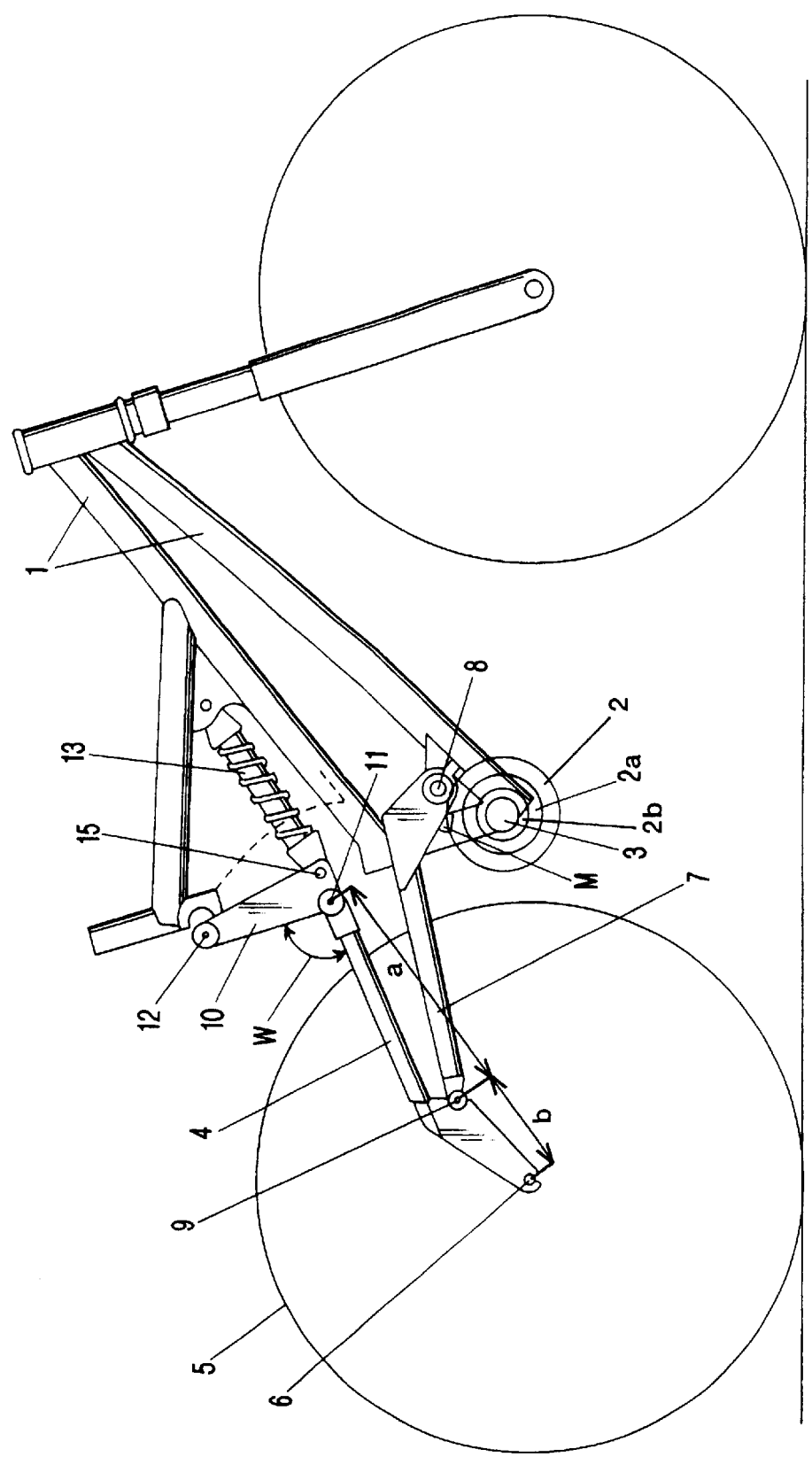
FIGS. 1a and b a first embodiment of a bicycle in the unsprung base position as well as in the maximum compressed spring position.
Figure 2:
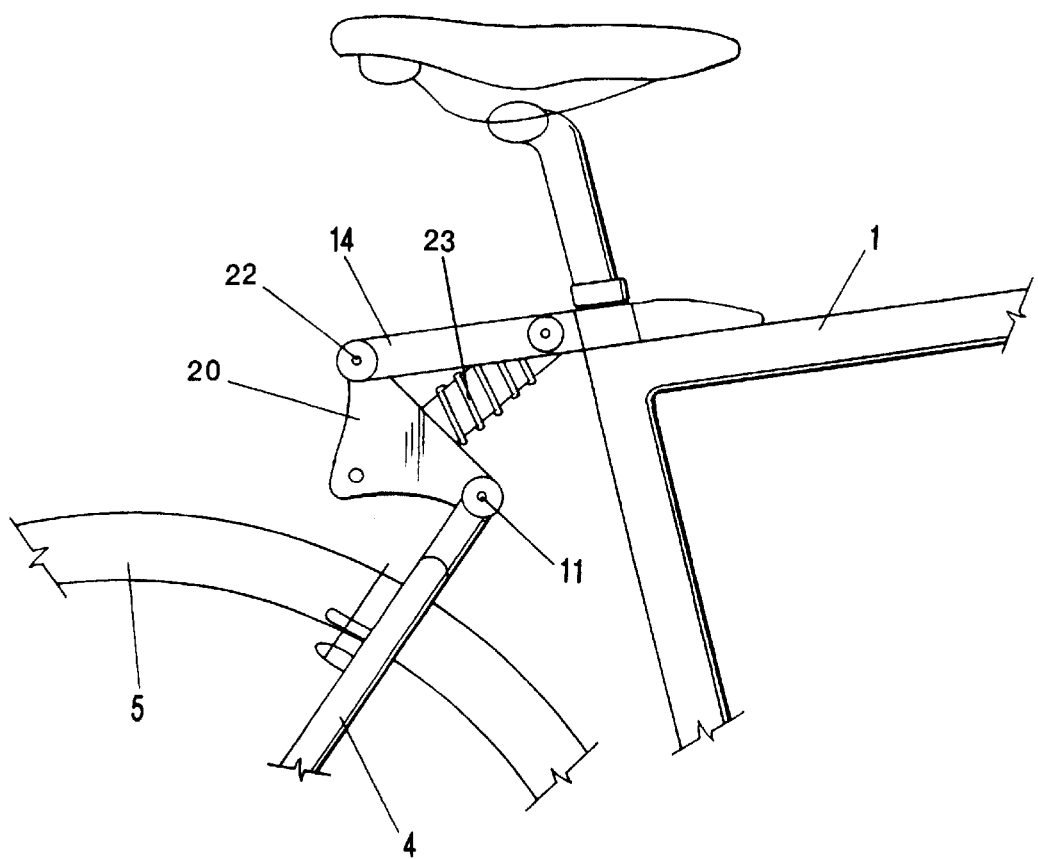
FIG. 2 an alternative arrangement of the second lever as well as of the spring.

FIGS. 1a and b illustrate the main embodiment of the inventive bicycle, while FIG. 2 shows an alternative thereto.

The bicycle of the first embodiment in FIGS. 1a and b is provided with a frame 1. This frame 1 is provided in the lower area, in general, with a set of three driving chain wheels 2 with a bearing 3.

Furthermore, a wheel support member 4 is arranged at the frame 1 and is provided at its rearward lower end with a rear wheel 5 that is supported as to be pivotable about an axle 6. A lower, first lever 7 is being arranged between the frame 1 and the wheel support member 4, with the connections at the ends being embodied as rotary bearings 8, 9. In the illustrated embodiment, the forward rotary bearing 8 is positioned above the largest driving chain wheel 2. However, it is also conceivable that the forward rotary bearing 8 is positioned instead above the intermediate 29 or even the smallest 26 driving chain wheel 2. The lever 7 is tilted downwardly in the area of this forward rotary bearing 8. The rear rotary bearing 9 is positioned at a certain distance above the axle 6 of the rear wheel 5, namely, approximately at a distance of ⅓ of the entire length of the wheel support member 4. In this area, the wheel support member 4 is also tilted at an obtuse angle.

The upper end portion of the wheel support member 4 is connected by a second lever 10 and rotary bearings 11, 12 to the frame 1. In the base position of the bicycle, as illustrated in FIG. 1a, the second lever 10 is tilted upwardly. The angle between the connecting line between the rotary bearings 9 and the rotary bearing 11, on the one hand, and the connecting line between the rotary bearing 11 and the rotary bearing 12 amounts to approximately 110°. Moreover, in the area of the lower rotary bearing 11 of the lever 10/wheel support member 4, a spring and/or damping element 13 is attached with its one end portion to the lever 10 by a rotary bearing 15, while it is attached with its other end to the frame 1. In the unsprung base position of the bicycle in FIG. 1a, it can be noticed that the wheel support member 4 and the spring and/or damping element 13 are essentially aligned with one another. It is especially essential in the arrangement of the spring and/or damping element 13 that the distance between the rotary bearings 11, 12 essentially corresponds to the distance between the rotary bearing 15 of the spring and/or damping element 13 and the rotary bearing 12. This avoids lever forces which act on the lever 10 when the spring is compressed.

Figure 1B:
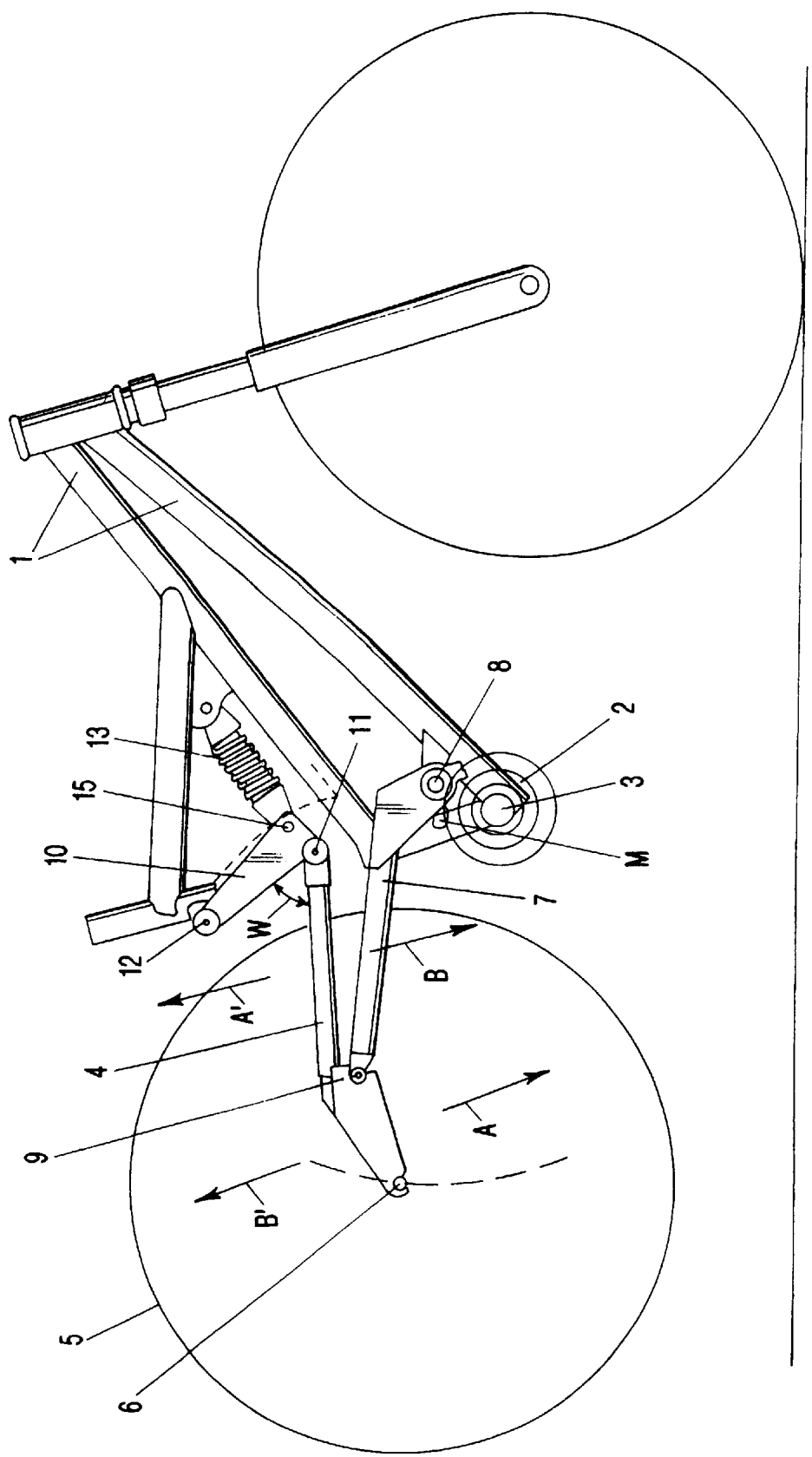

The function of the first embodiment of FIGS. 1a and b is as follows:

The rest position (spring not yet compressed) of the bicycle is illustrated in FIG. 1a, while FIG. 1b shows the maximum compressed spring position. Due to the arrangement of four rotary bearings 8, 9, 11, 12 of the two levers 7, 10, the rear wheel 5 performs a compensation curve during spring compression. In particular, the axle 6 of the rear wheel 5 performs an approximate circular movement (illustrated in dashed lines in FIG. 1b) about the bearing 3 of the driving chain wheel 2 or about a center point M spaced from the bearing 3. The spacing of the center point M from the bearing 3 can reach approximately up to the circumference of the largest drive chain wheel 2. The driving forces have no effect on the spring compression or they counteract it. The brake forces as well have no effect on the activation process or they support it. Due to the arrangement of the points axle 6/rotary bearing 9/rotary bearing 12, a reorientation of the driving force A into the driving force A' is achieved within the rotary bearing 9 and a reorientation of the brake force B into the brake force B'. The larger the distance of the rotary bearing 9 is from the axle 6 of the rear wheel 5, the larger is the force A' (relative to the driving force A) and the smaller is the force B' (relative to the brake force B). Depending on the angle w between the connecting line between the rotary bearings 9, 11, on the one hand, and the connecting line between the rotary bearings 11, 12, on the other hand, the reverse forces A' and B', respectively, generate, with respect to the movement of the axle 6 of the rear wheel 5, a "spring extension" (whereby "slipping" is prevented) during the initial pedal stroke (driving force A) and, analogously, a "spring-compression" (which counteracts the "catapulting tendency" of the rider on braking) on braking (brake force B). For the spring compression, the angle w lies approximately in the range of between 45° and 90°, while it lies between 90° and 180° for the spring extension. However, if the angle w is approximately 110°-as is shown in the illustrated embodiment—the brake effect as well as the drive effect are rather low. Basically, the choice of the positioning of the rotary bearing 9 (in conjunction with the other bearing positions) determines the shape of the wheel lifting curve, namely, of the movement of the axle 6 on spring compression.

The advantages of the inventive spring kinematic behavior are as follows:

Basically, the advantage of the inventive kinematic behavior, as opposed to common spring systems, lies in the co-operation of all of the achievable individual advantages. Due to the ideal wheel lifting curve, no pedal back kick occurs during spring compression. Because of the "reversing effect" within the rotary bearing 9 no spring compression occurs during the initial pedal stroke, i.e., no power loss, rather, a light spring extension with more surface friction. No spring extension occurs on braking, i.e., no risk of a being thrown off forwardly when braking sharply (so-called brake diving), rather a slight spring-compression on braking occurs. The relatively high position of the rotary bearing 9 results in a better responsiveness of the spring arrangement. Furthermore, the chain lies exposed due to the high position of the chain strut. A wedging in of the chain is thereby excluded. Furthermore, because of the compact, retracted design with short strut members, a relatively light-weight construction as a whole is possible. Finally, an increased lateral and distortion resistance is achieved by the distribution of the torsional forces onto four bearing points.

FIG. 2 shows a section of a modified arrangement of the lever 20 and the spring and/or damping element 23 at the frame 1. In this case, the frame 1 is provided with a rearwardly projecting holding member 14 at the rear end portion of which the second lever 20 is attached with its upper rotary bearing 22. One end of the spring and/or damping element 23 is attached to the center area of the second lever 20, while the other end is attached to the holding member 14. In this embodiment, the spring and/or damping element 23 is, thus, laterally offset relative to the wheel support member 4. This arrangement of the upper lever 20 at the holding member 4 permits the attachment of a luggage carrier (not illustrated).

What is claimed is:

1. A two-wheeled vehicle comprising:

a frame (1) having a wheel support member (4) at the rear of said frame (1);

a drive chain (2) supported by a bearing at a lower end of said frame (1);

a rear wheel (5) spring-supported at said wheel support member (4);

a first lever (7) rotatably mounted by a first rotary bearing (8) at said frame (1) and by a second rotary bearing (9) at said wheel support member (4), wherein said first lever (7) moves beneath said wheel support member (4);

a second lever (10) rotatably mounted at an upper end portion of said wheel support member (4) and said frame (1), respectively;

a spring element (13) rotatably mounted at said frame (1) and one of said levers;

wherein said second rotary bearing (9) is positioned above an axle (6) of said rear wheel (5) and is positioned at said wheel support member (4), when viewed from said axle (6) of said rear wheel (5) toward a front end of said vehicle, at a location of between 0.045 to 0.8 times the length of said wheel support member (4) from said axle of said rear wheel;

wherein the axle (6) of said rear wheel (5), upon spring compression movement, produces a trajectory of movement which is substantially circular.

2. A vehicle according to claim 1, wherein said second rotary bearing (9) is positioned at said wheel support member (4) at a spacing of least 20 mm vertically above said axle (6) of said rear wheel (5).

3. A vehicle according to claim 1, wherein said first rotary bearing (8) is positioned at said frame (1) above skid bearing (3) of said drive chain wheel (2).

4. A vehicle according to claim 3, wherein said first rotary m bearing (8) is positioned at said frame (1) above said drive chain wheel (2).

5. A vehicle according to claim 1, wherein said second lever (10) is tilted upwardly or downwardly relative to said wheel support member (4).

6. A vehicle according to claim 5, wherein, in a rest position of said spring element (13), an angle (w) between a connecting line connecting said second rotary bearing (9) and a third rotary bearing (11), connecting said wheel support member (4) to said second lever (10), and a connecting line, connecting said third rotary bearing (11) and a fourth rotary bearing (12) connecting said second lever (10) to said frame (1), is between 90° and 180°.

7. A vehicle according to claim 1, wherein said spring element (13) comprises a damping element.

* * * * *